(12) United States Patent
Suh

(10) Patent No.: US 6,428,025 B1
(45) Date of Patent: Aug. 6, 2002

(54) AUTOMOTIVE SUSPENSION SYSTEM FOR INCREASING ROLL SAFETY

(75) Inventor: Eun-Suk Suh, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/741,545

(22) Filed: Dec. 19, 2000

(30) Foreign Application Priority Data

Aug. 17, 2000 (KR) .......................................... 2000-47517

(51) Int. Cl.⁷ ............................... B60G 7/00; B60G 11/00
(52) U.S. Cl. ........................ 280/124.106; 280/124.17; 280/124.175; 267/264; 267/265
(58) Field of Search ..................... 280/124.106, 124.17, 280/124.175; 267/260, 265, 261, 264

(56) References Cited

U.S. PATENT DOCUMENTS

| | | | | |
|---|---|---|---|---|
| 1,265,623 A | * | 7/1918 | Currey ....................... | 267/260 |
| 1,964,625 A | * | 6/1934 | Dwork ....................... | 267/260 |
| 2,547,993 A | * | 4/1951 | Benz ......................... | 267/260 |
| 3,929,347 A | * | 12/1975 | Masser ...................... | 280/124.17 X |
| 4,125,276 A | * | 11/1978 | Levasseur ................... | 280/124.17 X |
| 4,618,337 A | * | 10/1986 | Okawa et al. ............... | 280/124.175 |
| 4,718,693 A | * | 1/1988 | Booher ...................... | 280/124.17 X |
| 5,114,125 A | * | 5/1992 | Srch et al. ................. | 280/124.17 |
| 5,141,209 A | * | 8/1992 | Sano et al. ................. | 267/260 |
| 6,118,083 A | * | 9/2000 | Boyovich et al. ........... | 280/124.17 X |
| 6,247,689 B1 | * | 6/2001 | Haesle et al. .............. | 280/124.17 |

* cited by examiner

*Primary Examiner*—Paul N. Dickson
*Assistant Examiner*—Toan C To
(74) *Attorney, Agent, or Firm*—Christie, Parker & Hale, LLP

(57) ABSTRACT

An automotive suspension is provided having a leaf spring coupled to a chassis of a vehicle and having a spring eye having a serrated inner surface. The system further has a spring pin having a serrated outer surface coupled to the serrated inner surface of the spring eye, and a fixing bracket limiting rotation of the spring pin relative to the vehicle chassis.

6 Claims, 2 Drawing Sheets ions No. 2000-47517, filed on Aug. 17, 2000.

AUTOMOTIVE SUSPENSION SYSTEM FOR INCREASING ROLL SAFETY

CROSS-REFERENCE TO RELATED APPLICATION

This application claims priority of Korea patent Application No. 2000-47517, filed on Aug. 17, 2000.

BACKGROUND OF THE INVENTION

1. Field of the Invention

The present invention relates to an automotive suspension system for increasing roll safety, and more particularly to an automotive suspension system for increasing roll safety adapted to restrict twist at a tip portion of a leaf spring when an automobile is tilted to one direction to thereby increase strength of the leaf spring with generation of a stabilizing function.

2. Description of the Prior Art

In general, an automotive suspension system serves to connect an axle and a body to adequately attenuate vibration or shock of the axle received from road surface while a vehicle is running, thereby improving people's comfort riding in the vehicle and preventing damage to the body. Particularly, an automotive suspension system for trucks or buses includes side frames 1 arranged lengthwise at left and right sides of the body and leaf springs 2 fixed lengthwise to the frames 1 and mounted to an axle via a U-bolt, as illustrated in FIG. 1.

Furthermore, the automotive suspension system is of course mounted with a stabilizer mounted at a tip and an axle for fixing both tip ends in order to decrease rolling of the body.

However, there is a problem in a heavy-duty vehicle such as truck or the like in that, when the vehicle rolls around, careening caused by centripetal force according to weight of overloaded cargoes or high speed of the vehicle cannot be coped by a restoring force of a stabilizer, resulting in possible overturn of vehicle. Consequently, it is imperative that a suspension system is developed with a stabilizer with a notion of increased restoring force thereof to obtain safety of the vehicle at all events.

SUMMARY OF THE INVENTION

The present invention is disclosed to solve the aforementioned problems and it is an object of the present invention to provide an automotive suspension system for increasing roll safety adapted to restrict a twist at a tip portion of a leaf spring when an automobile rolls around to thereby increase strength of leaf spring with generation of stabilizing function.

In order to accomplish the aforementioned object of the present invention, there is provided an automotive suspension system comprising leaf springs fixed lengthwise on side frames arranged lengthwise at left and right sides of a body with the central portion thereof being mounted to an axle, a stabilizer mounted with both edges being mounted at ends of the axle to decrease rolling of the body, wherein serration is respectively formed at the internal surface of a spring eye that forms an end of the leaf spring and at the outer surface of a spring pin for corresponding insertion therebetween and a hitching edge is formed at its lower portion being protruded by eliminating the upper portion of the leaf spring in a semicircular shape, so that an insertion hole is formed with a stopper being protruded toward the center from the top to restrict the rolling by getting the hitching edge of the spring pin to be inserted into a fixing bracket to generate a twist at the leaf spring when an automobile tilts to one direction.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Objects and aspects of the invention will become apparent from the following detailed description of a preferred embodiment with reference to the accompanying drawings.

Figure 1:
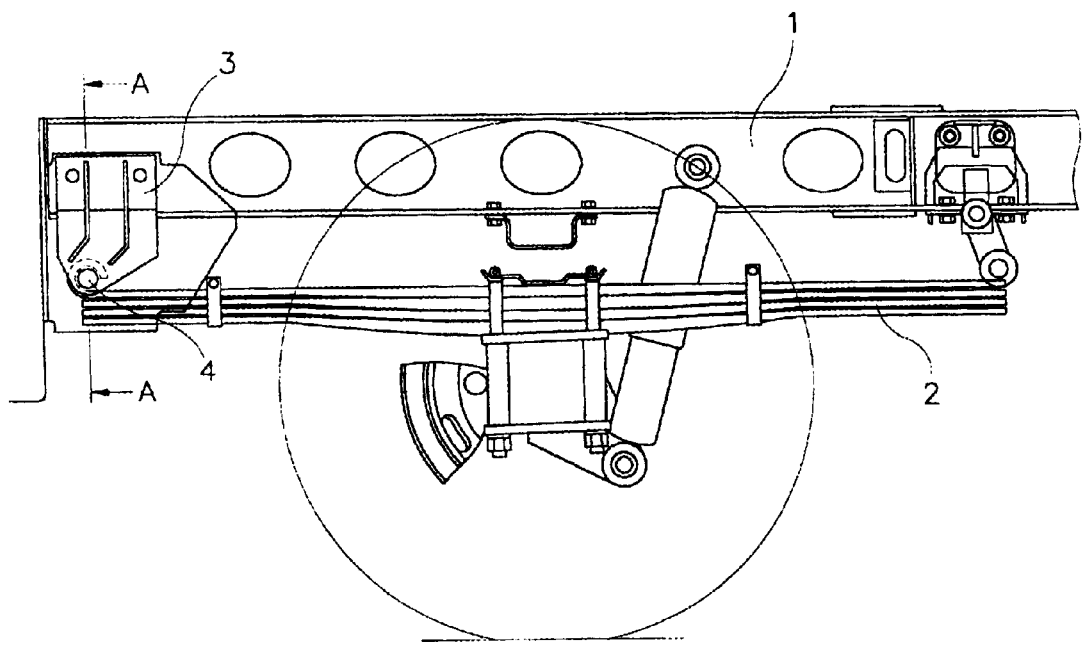
FIG. 1 is a partial view for illustrating the structure of an automotive suspension system for increasing roll safety.
Figure 2:
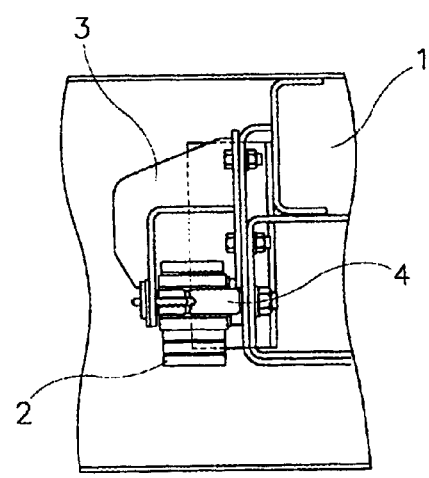
FIG. 2 is a partial cross-sectional view cut along line A—A shown in FIG. 1.

FIG. 1 is a partial view for illustrating the structure of an automotive suspension system for increasing roll safety in accordance with the present invention. In the present invention, the automotive suspension system is made in a coupling structure, including: side frames 1 arranged lengthwise at left and right sides of a body; leaf springs 2 mounted to an axle via a U-bolt; and a stabilizer (not shown) with both edges being mounted to ends of the axle to decrease rolling of the body, wherein a fixing part formed at one of the leaf springs 2, as shown in FIG. 2, is formed with a fixing bracket 3 and a spring pin 4 attached onto the side frame to generate twist at the leaf spring 2 when the car tilts to one direction.

Figure 3:
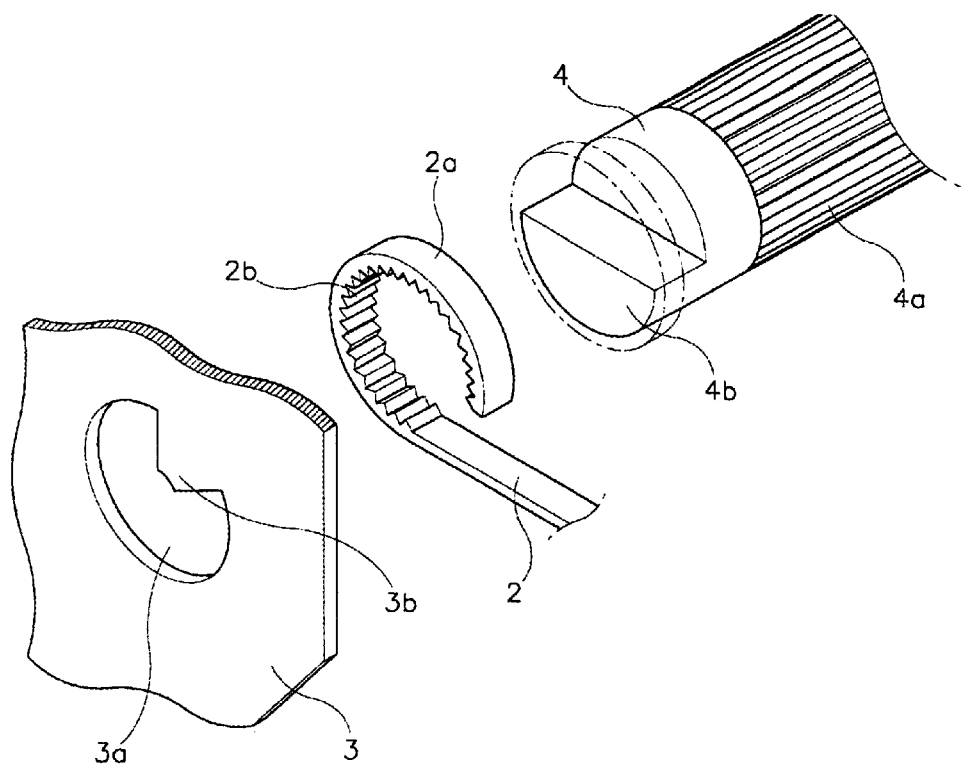
FIG. 3 is a perspective view for illustrating attachment or detachment of a leaf spring to generate supplementary stabilizing function of an automotive suspension system in accordance with the present invention.
Figure 4:
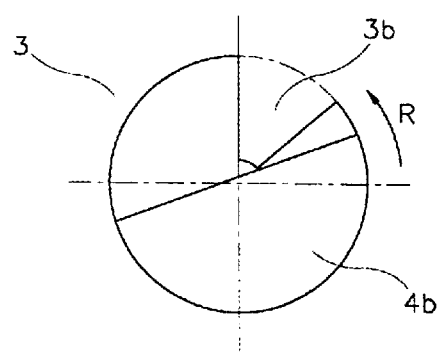
FIG. 4 is a view for illustrating an operational state of an automotive suspension system to generate supplementary stabilizing function in accordance with the present invention.

In other words, the aforementioned coupling structure of an automotive suspension system for generating a twist when the car rolls around, includes as shown in FIG. 3: serration 2b formed at an internal surface of a spring eye 2a at the end of the leaf spring 2 and at an outer surface of the spring pin 4 for corresponding insertion when the spring pin 4 is inserted into the spring eye 2a of the leaf spring 2; a hitching edge 4b with its lower portion being protruded as the upper portion of the edge of the spring pin 4 is eliminated in a semicircular shape; and an insertion hole 3a formed with a stopper 3b protruded toward the center from the upper portion to restrict rotation by allowing the hitching edge 4b of the spring pin 4 to be inserted into a fixing bracket 3.

At this time, in order to firmly insert the spring pin 4 into the fixing bracket 3 and prevent looseness, a flange (shown in a dot line in the drawing) having a relatively large diameter is integrated at the end of the hitching edge 4b, as shown in FIG. 3.

Operations of the present invention will now be described in detail.

Generally, when a vehicle is running, the suspension system of the present invention operates in the same manners as the conventional system, such that redundant descriptions are omitted. However, descriptions will be made on occurrences of rolling when wheels of the vehicle move irregularly up or down, causing twists and when its body tilts to one side as the vehicle is running around.

At this time, as the spring pin 4 rolls to the direction R it turns the spring eye 2a of the leaf spring 2 via serrations 2b, 4a inserted together until the hitching edge 4b of the spring pin 4 is blocked from being rolled by the stopper 3b that is protruded to the upper portion of the insertion hole 3a of the fixing bracket 3.

Then, the rotational force of the spring pin 4 is transmitted to the spring eye 2a of the leaf spring 2 coupled via inversely formed serrations 2b and 4a, thereby generating twist at the spring eye 2a of the leaf spring 2.

Therefore, the twist generated at the leaf spring 2 according to an increased weight when a vehicle turns to one side is eliminated by removal of the twist at the leaf spring 2 when the vehicle returns to its normal state after turning around. In consequence, the returning force of the leaf spring 2 is added to that of the stabilizer in the same direction, so as to swiftly, safely decrease the rolling of the body.

As shown above, there is an advantage in the automotive suspension system of the present invention in that twist is generated at the leaf spring, when an automobile tilts to one direction, to add the returning force of the leaf spring to that of the stabilizer, thereby significantly decreasing rolling of the body and effectively securing a high safety.

What is claimed is:

1. An automotive suspension system for increasing roll safety comprising:

a vehicle having a chassis;

a leaf spring having a spring eye having an internal surface having serrations, the leaf spring coupled to the chassis;

a spring pin coupled to the chassis and coupled with the spring eye, wherein the spring pin has a longitudinal axis and an outer surface, wherein the spring pin rotates about said longitudinal axis and has serrations formed on spring pin outer surface engaging the serrations formed on the spring eye internal surface; and a fixing bracket limiting rotation of the spring pin.

2. An automotive suspension system as recited in claim 1 wherein the spring pin longitudinal axis penetrates the spring eye.

3. An automotive suspension system as recited in claim 1 further comprising:

a hitching edge protruding from an end of said spring pin; and a fixing bracket having an opening, wherein the hitching edge penetrates the opening for restraining rotation of the pin.

4. An automotive suspension system as recited in claim 3 wherein said hitching edge of said spring pin if defined by a protruding lower portion of the pin defined by a depressed generally semi-circular upper portion of the pin, wherein a stopper extending from the bracket protrudes in the opening of the bracket.

5. An automotive suspension system for increasing roll safety comprising:

a vehicle having a chassis;

a leaf spring coupled to the chassis and having a spring eye having a serrated inner surface;

a spring pin having a serrated outer surface coupled to the serrated inner surface of the spring eye, wherein the spring pin has a longitudinal axis, and wherein the spring pin rotates about the longitudinal axis; and a fixing bracket limiting rotation of the spring pin.

6. An automotive suspension system as recited in claim 5 wherein the spring pin longitudinal axis penetrates the spring eye.

* * * * *